United States Patent
Lin

(10) Patent No.: US 8,836,932 B2
(45) Date of Patent: Sep. 16, 2014

(54) INSPECTING EQUIPMENT FOR INSPECTING A LIGHT EMISSION CHARACTERISTIC OF A MONITOR

(71) Applicant: Taiwan Power Testing Technology Co., Ltd., New Taipei (TW)

(72) Inventor: Yu-Chiang Lin, New Taipei (TW)

(73) Assignee: Taiwan Power Testing Technology Co., Ltd., New Taipei (TW)

( * ) Notice: Subject to any disclaimer, the term of this patent is extended or adjusted under 35 U.S.C. 154(b) by 0 days.

(21) Appl. No.: 13/848,240

(22) Filed: Mar. 21, 2013

(65) Prior Publication Data

US 2014/0192351 A1 Jul. 10, 2014

(30) Foreign Application Priority Data

Jan. 4, 2013 (TW) .............................. 102100318 A

(51) Int. Cl.
- *G01J 1/00* (2006.01)
- *G01J 1/42* (2006.01)
- *G01J 1/04* (2006.01)

(52) U.S. Cl.
CPC .... *G01J 1/42* (2013.01); *G01J 1/04* (2013.01); *G01J 1/4257* (2013.01)
USPC .............. 356/213; 356/218; 356/222; 356/42

(58) Field of Classification Search
CPC .......... G01J 1/4257; G01J 1/42; G02F 1/1309
See application file for complete search history.

(56) References Cited

U.S. PATENT DOCUMENTS

| | | | |
|---|---|---|---|
| 5,966,458 A * | 10/1999 | Yukawa et al. | 382/141 |
| 7,808,630 B2 * | 10/2010 | Shin | 356/239.1 |
| 2001/0016060 A1 * | 8/2001 | Ahn | 382/141 |
| 2004/0213449 A1 * | 10/2004 | Safaee-Rad et al. | 382/141 |
| 2009/0219521 A1 * | 9/2009 | Shin | 356/239.2 |

* cited by examiner

*Primary Examiner* — Michael P Stafira
(74) *Attorney, Agent, or Firm* — Kolisch Hartwell, P.C.

(57) ABSTRACT

Disclosed is an inspecting equipment for inspecting a light emission characteristic of a display screen includes: a carrying device provided for carrying the display screen, a cover device and a data analyzing device. The cover device has a detecting surface provided with a plurality of luminance detectors, and covers an emitting surface of the display screen to form a darkroom between the cover device and the detecting surface. A plurality of corresponding luminance information is generated by the luminance detectors provided for detecting a plurality of measuring zones of the emitting surface. The data analyzing device receives the luminance information and analyzes the light emission characteristic of the display screen according to the luminance information. And, it is thus able to rapidly inspect the light emission characteristic of the display screen during manufacture process, and is easy to be applied to a present producing line.

10 Claims, 5 Drawing Sheets

INSPECTING EQUIPMENT FOR INSPECTING A LIGHT EMISSION CHARACTERISTIC OF A MONITOR

CROSS-REFERENCE TO RELATED APPLICATION

This application claims priority to Taiwanese Patent Application No. 102100318, filed Jan. 4, 2013, which is hereby incorporated by reference.

FIELD OF THE INVENTION

The present invention relates to an inspecting equipment for inspecting a display screen, and more particularly to an inspecting equipment for inspecting a light emission characteristic of a display screen.

BACKGROUND OF THE INVENTION

A display screen, such as a TV, a computer screen or a smart phone, is for displaying image frames. With the rise of demand of display screens, the producing yield becomes increasing.

The display screen illustrates a screen by emitting light in a manner that red light, green light and blue light are controlled and adjusted to generate all kind of variety of colors on the screen. For example, a true color of the display screen is provided by setting each of red light, green light and blue light into 256 degrees in luminance so as to combine the above three kinds of light to become 16777216 colors.

In order to determine the quality of the display screen, the regulation is formulated by the industry of the display screen to establish a standard for inspecting of liquid crystal displays. It includes the criterion of luminance, luminance uniformity, color uniformity, contrast, color chromaticity, color gamut, color tracking, response time and gamma.

The regulation, applied in inspecting method, is too strict to practice in a producing line. For example, the inspecting method for the luminance is regulated to inspect in a darkroom where an environmental leakage light should be less than 2 lux. For this, the display screen must be moved to a darkroom for inspection. Further, the inspection for the luminance uniformity is regulated to inspect a plurality of light points, so an inspector must change the inspecting position to inspect different light points by using the conventional lux meter. And each manual inspecting position will be varied. Furthermore, the inspection for color chromaticity and color uniformity is required to be inspected by processing several kinds of colors of light by using lux meters with different wavelength light, and it thus increases complexity for inspection.

SUMMARY OF THE INVENTION

However, the above conventional inspection method can only be applied by a sampling process, since it cannot be processed in a rapid way and a full percentage cannot be implemented. Besides, if manual inspection is applied, it leads to uncertain standard of since different mental situations or physical conditions are factors for consideration. Therefore, it may cause a weird situation that the display screens are with the same characteristic but are inspected as having different inspected results.

Accordingly, an aspect of the present invention is for providing an inspecting equipment to rapidly inspect a light emission characteristic of a display screen, and the inspecting equipment is also easily applied to the automation inspection.

An inspecting equipment for inspecting a light emission characteristic of a display screen includes: a carrying device for carrying the display screen, a cover device and a data analyzing device. The cover device has a detecting surface provided with a plurality of luminance detectors, and is provided for covering an emitting surface of the display screen to form a darkroom between the cover device and the detecting surface. A plurality of corresponding luminance information is generated by the luminance detectors which are provided for detecting a plurality of measuring zones of the emitting surface. The data analyzing device receives the luminance information and analyzes the light emission characteristic of the display screen according to the luminance information.

In a preferred embodiment of the present invention, the luminance detectors are arranged in an array form of an array.

In a preferred embodiment of the present invention, the luminance information is an electric signal.

In a preferred embodiment of the present invention, the carrying device further includes an elevating means for adjusting a height of the cover device.

In a preferred embodiment of the present invention, the carrying device further includes a transportation means for transporting the display screen to an inspecting location where the cover device is provided.

In a preferred embodiment of the present invention, it further includes a screen adjustment device for adjusting a screen of the display screen.

In a preferred embodiment of the present invention, the luminance detectors include an all-optical wavelength detector for detecting a luminance of all-optical wavelength of the light.

In a preferred embodiment of the present invention, the luminance detectors include a red detector, a green detector, and a blue detector for detecting a red luminance, a green luminance and a blue luminance.

In a preferred embodiment of the present invention, it further includes a reading signal device which is connected with the luminance detectors, wherein the reading signal device reads the luminance information in an alternatively switching and reading manner, and transmits the luminance information to the data analyzing device.

In a preferred embodiment of the present invention, it further includes a configuration adjustment device for adjusting a display configuration of the display screen according to the light emission characteristic.

By means of the present invention, it allows a rapid inspection for display screens even at the same time the display screens are assembled in the producing lines. Thus the corresponding action for adjusting configuration of the display screens is allowed to adjust with regard to the result of inspection. Therefore, an inspecting process with the same standard is obtained.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
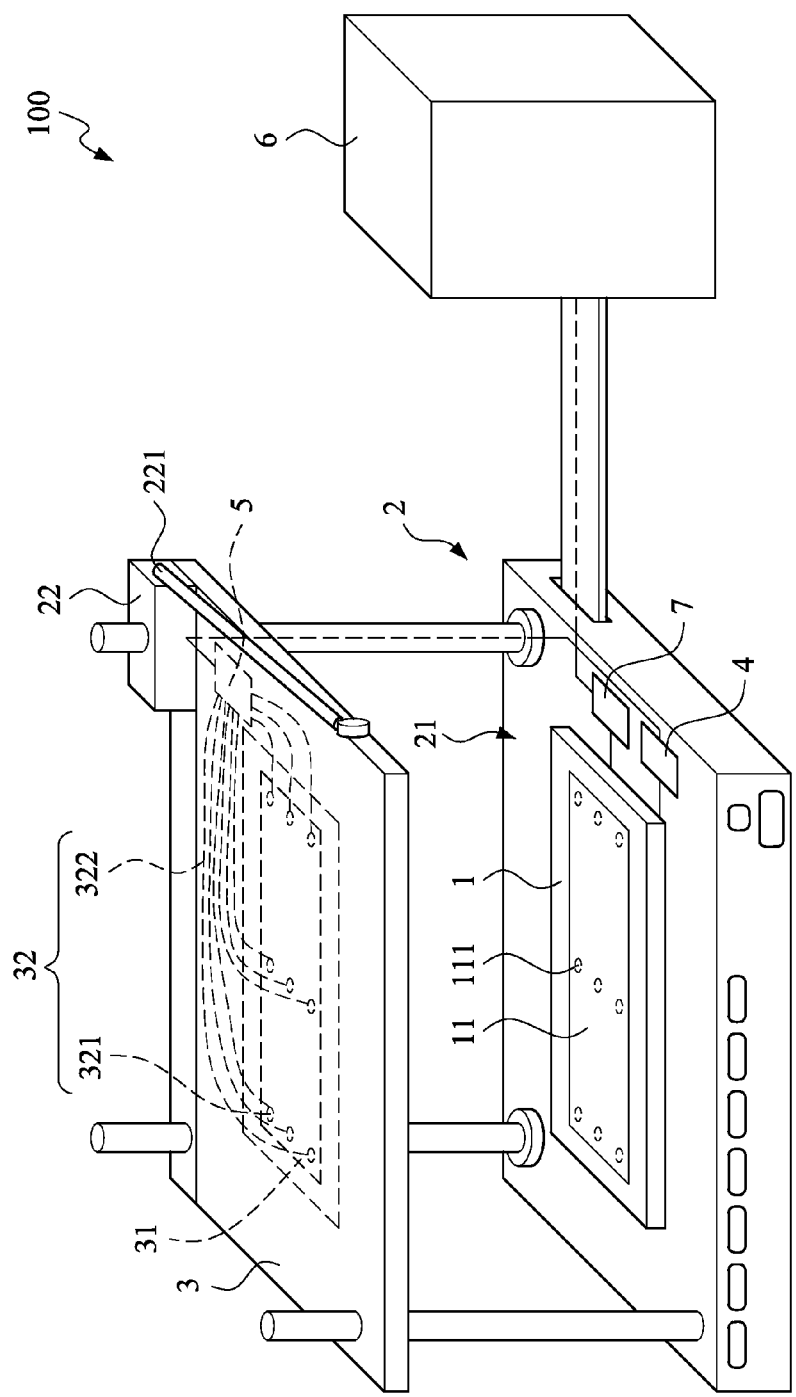
FIG. 1 is a stereogram illustrating the inspecting equipment of the one embodiment according to the present invention.

Refer to FIG. 1 to FIG. 7. An inspecting equipment 100 is for inspecting the light emission characteristics of a display screen 1. The light emission characteristics include luminance, luminance uniformity, color uniformity, contrast, color chromaticity, color gamut, color tracking, response time and gamma. The inspecting equipment 100 includes a carrying device 2, a cover device 3, a screen adjustment device 4, a reading signal device 5, a data analyzing device 6, and a configuration adjustment device 7.

In the embodiment, the display screen 1 is a liquid crystal display. The display screen 1 has an emitting surface 11 on which there are defined with a plurality of measuring zones 111. The embodiment is not limited to this. The display screen can be alternative as a cathode ray tube or any other display screen which displays image frames by emitting light.

Figure 2:
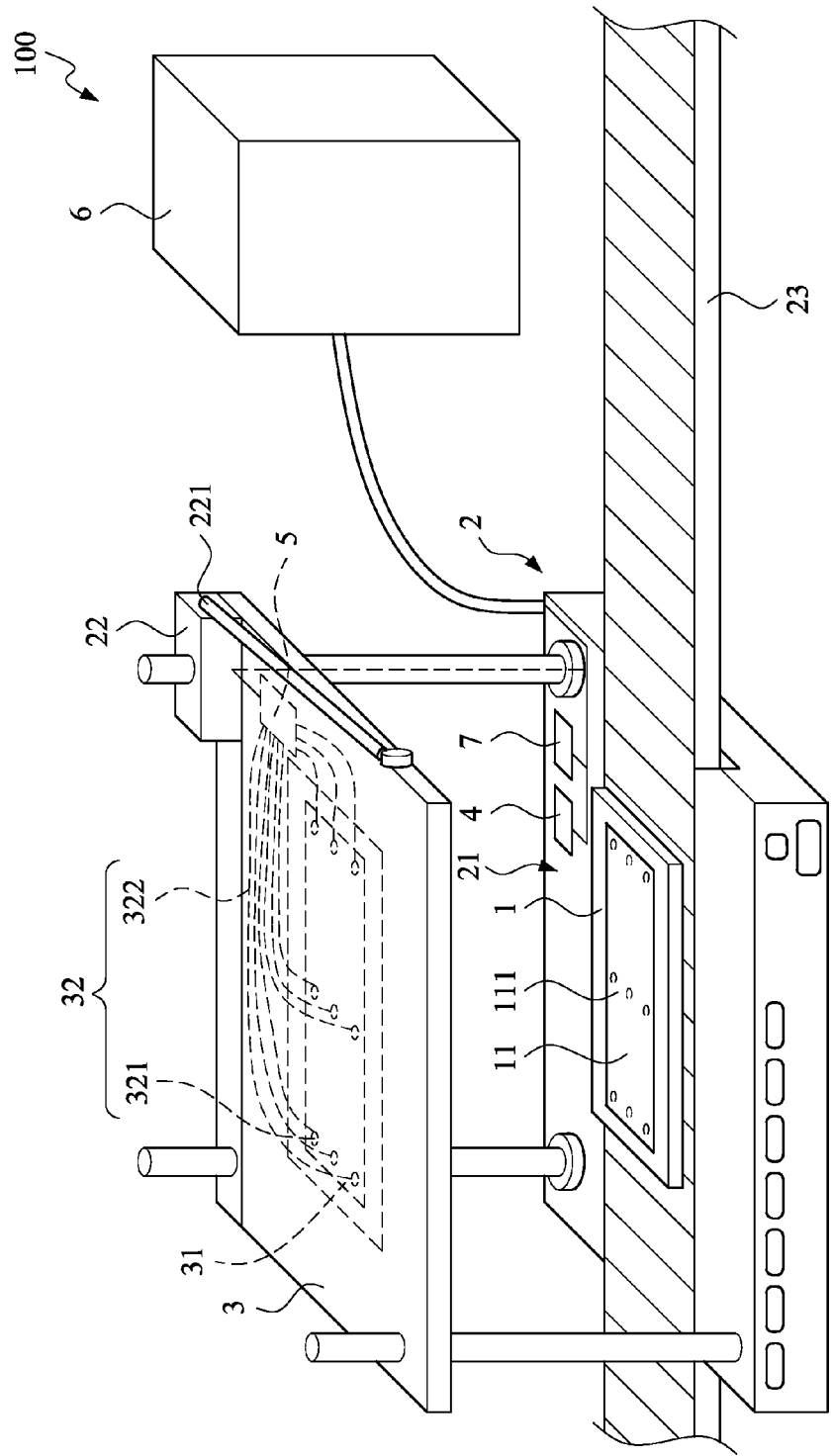
FIG. 2 is a stereogram illustrating an inspecting equipment of the another one embodiment according to the present invention.

The carrying device 2 is provided for carrying the display screen 1. The carrying device 2 is provided with an inspecting location 21 and an elevating means 22. The cover device 3 is provided above the inspecting location 21. The cover device 3 can cover the display screen 1 in different height by adjusting the position, i.e., height, of the cover device 3 by means of the elevating means 22. The elevating means 22 supports the carrying device 2 and adjusts the height of the cover device 2 by using a pneumatic supporting rod 221. In the other embodiment as shown in FIG. 2, the carrying device 2 further is provided with a transportation means 23 for transporting the display screen 1 to the inspecting location 21. With the use of the transportation means 23 for transporting the display screen 1 and the use of the elevating means 22 for controlling the cover device 3 to cover the display screen 1, the effectiveness of the automated inspection is achieved and the inspecting equipment can be applied to the present producing lines.

Figure 3:
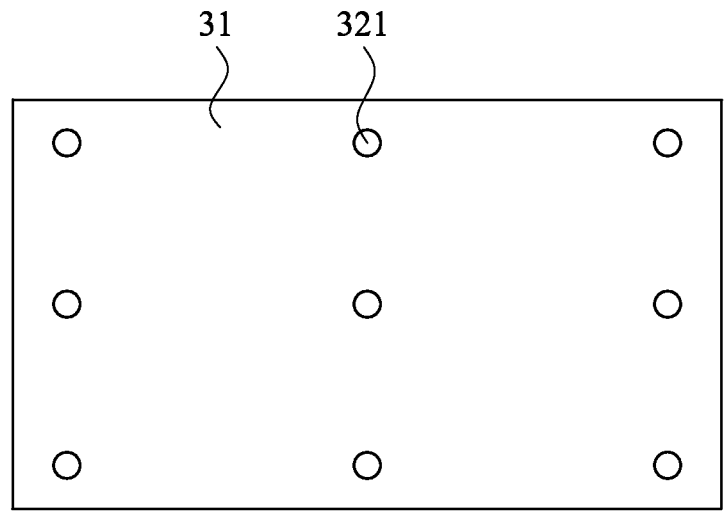
FIG. 3 is a schematic diagram illustrating a detecting surface of the inspecting equipment of the one embodiment according to the present invention.
Figure 4:
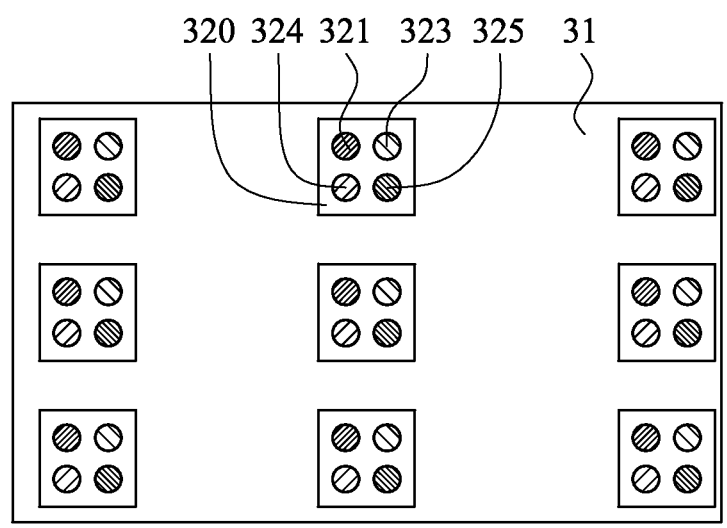
FIG. 4 is a schematic diagram illustrating a detecting surface of an inspecting equipment of the another one embodiment according to the present invention.
Figure 5:
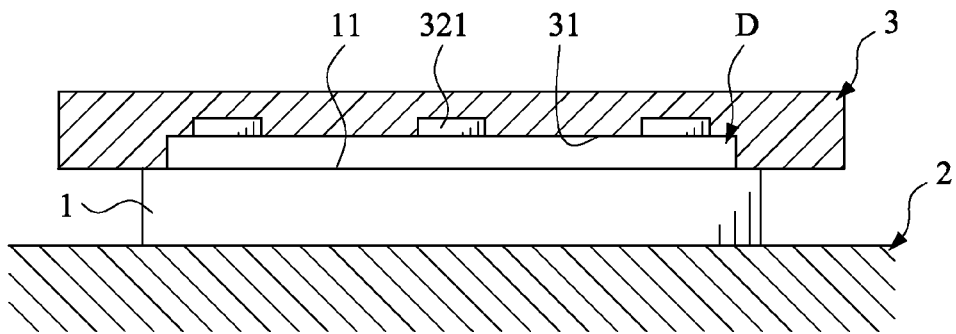
FIG. 5 is a sectional view schematic diagram illustrating a cover device of the inspecting equipment of the one embodiment according to the present invention.
Figure 6:
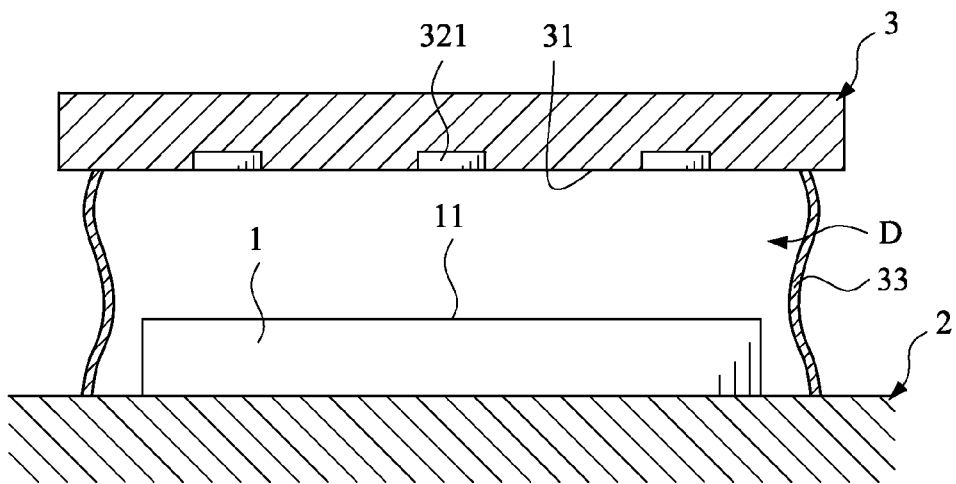
FIG. 6 is a sectional view schematic diagram illustrating a cover device of an inspecting equipment of the another one embodiment according to the present invention.
Figure 7:
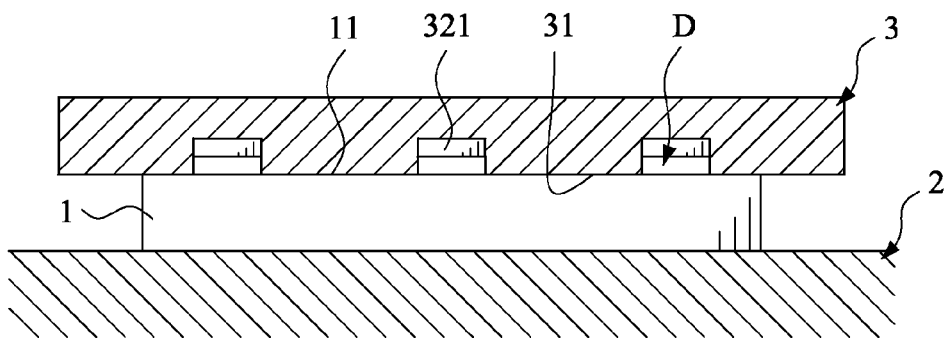
FIG. 7 is a sectional view schematic diagram illustrating a cover device of an inspecting equipment of the another one embodiment according to the present invention.

The cover device 3 has a detecting surface 31 which is provided with 9 luminance detectors 32. The cover device 3 covers the emitting surface 11 of the display screen 1 to form a darkroom D between the cover device 3 and the detecting surface 11, and thus the luminance detectors 32 is used for detecting the measuring zones 111 of the emitting surface 11 to generate a plurality of corresponding luminance information. In the detail, the luminance detectors 32 are arranged in a form of an array for detecting the luminance of the measuring zones 111 of the emitting surface 11 uniformly, as shown in FIG. 3. In the embodiment, the luminance detector 32 is a photoelectric detector. The photoelectric detector detects the luminance and generates an electric signal by transforming light energy to electrical energy, and the electric signal is the luminance information. The luminance detectors 32 include an all-optical wavelength detector 321 and a signal cable 322. The all-optical wavelength detector 321 detects a luminance of all-optical wavelength of the light, and then the signal cable 322 transmits the luminance information from the all-optical wavelength detector 321 to the reading signal device 5. In the other embodiment, the luminance detectors 32 further include a red detector 323, a green detector 324, and a blue detector 325 for detecting a red luminance, a green luminance and a blue luminance. Further, the three colors detectors 323, 324 and 325 are disposed with a close relationship with the all-optical wavelength detector 321 to form a luminance detector group 320. The luminance detector groups 320 are arranged in a form of an array. Because each luminance detector 32 is very small, the luminance detectors 32 are closely disposed to incident the light in a close relationship. Accordingly, each luminance detector 321, 323, 324 and 325 of the luminance detector group 320 detects one measuring zone 111 or its proximity to analyze the luminance characteristic of each color light, such as color uniformity or color temperature. The embodiment is not limited to this. More luminance detectors 32 or other color detectors can be provided for different situations, and the luminance detector can be arranged in concentric circle or in irregular form. Further, in the embodiment, the detecting surface 31 of the cover device 3 is allocated to face inward. When the cover device 3 is placed to cover the emitting surface 11 of the display screen 1, a darkroom D is formed between the emitting surface 11 and the detecting surface 31 without the leakage of light as shown in FIG. 5. The embodiment is not limited to this. In the other embodiment, the cover device 3 is chosen as a shading cloth to cover the display screen 1 as show in FIG. 6. Alternatively, the detecting surface 31 of the cover device 3 closely contact the emitting surface 11 of the display screen 1 without leaking any light between the measuring zones 111 and the luminance detector 32.

The screen adjustment device 4, which is provided for adjusting the screen of the display screen 1, is connected with the display screen 1. For example, the screen adjustment device 4 is used for adjusting the screen of the display screen 1 with regard to the display of a single color, full luminance or full darkness according to the data analyzing device 6.

The reading signal device 5 is electrically connected with each luminance detector 32 to read the luminance information in an alternatively switching and reading manner, and then transmits the luminance information to the data analyzing device 6. In the detail, the reading signal device 5 is a switch which is connected to the signal cable 322 of luminance detectors 32. The reading signal device 5 rapidly switches the signal lines of the signal cable 322 to transmit the signals in sequence to the data analyzing device 6, so that the luminance information, generated from each luminance detectors 32, is transmitted to the data analyzing device 6. Further, because the switching frequency is very fast, the switch switches and reads such huge amount of luminance detectors 32 only in a few microseconds. Accordingly, each measuring zone 111 is to be detected at the same time, and each corresponding luminance information is transmitted to the data analyzing device 6. As the result, the luminance of these measuring zones 111 of the display screen 1 is rapidly inspected in a very short period.

The data analyzing device 6 receives the luminance information from the reading signal device 5 and analyzes the light emission characteristic of the display screen according to the luminance information. For example, the degree of luminance uniformity is obtained by dividing the Maximum luminance of all-optical wavelength of light by the minimum luminance of all-optical wavelength of light.

The configuration adjustment device 7 is provided for adjusting the display configuration of the display screen 1 according to the light emission characteristic. For example, a liquid crystal layer of a display screen tends to be distorted for its arrangement with respect to the electric field. Therefore, when a light emission characteristic of a display screen is varied with respect to the input of electric field, the configuration adjustment device 7 is provided for adjusting the display configuration of the display screen 1 by inputting an adjusting electric field to make the light emission characteristic to fit the standard.

Figure 8:
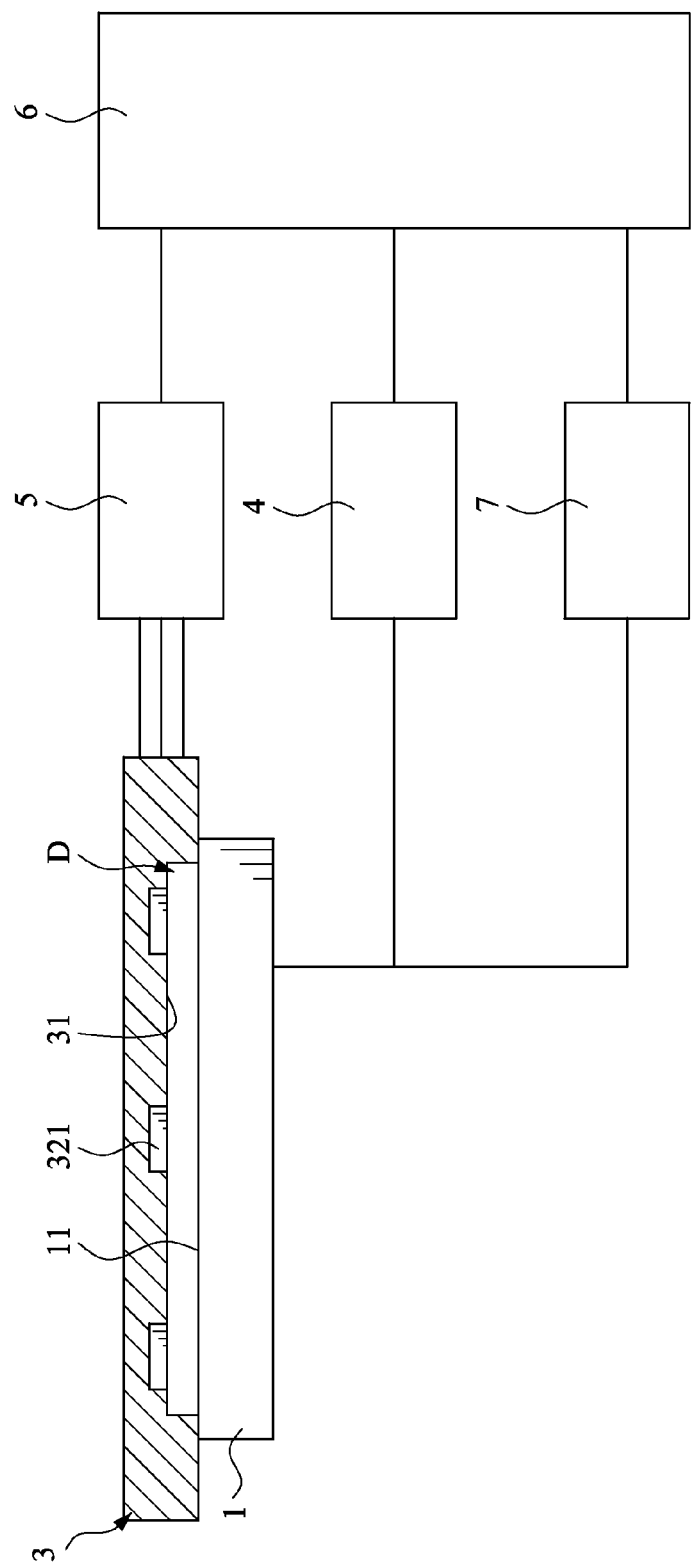
FIG. 8 is a block diagram illustrating the inspecting equipment of the one embodiment according to the present invention.

Refer to FIG. 8. After the cover device 3 covers the emitting surface 11 of the display screen 1, the data analyzing device 6 requires the screen adjustment device 4 to adjust the screen of the display screen 1. Next, the luminance detectors 32 of the cover device 3 detect and generate the corresponding luminance information. The reading signal device 5 reads the luminance information in sequence, and transmits the luminance information to the data analyzing device 6. Further, the data analyzing device 6 analyzes the light emission characteristic of the display screen 1 according to the luminance information. Finally, the configuration adjustment device 7 adjusts the display configuration of the display screen 1 according to the light emission characteristic. As a result, by means of technical means of this present invention, it is possible to rapidly inspect the light emission characteristics of the display screen, and achieves 100 percent inspection for the display screens to be inspected. Further, a screen of each display screen is inspected with the same standard.

The above description should be considered as only the discussion of the preferred embodiments of the present invention. However, a person skilled in the art may make various modifications to the present invention. Those modifications still fall within the spirit and scope defined by the appended claims.

What is claimed is:

1. An inspecting equipment for inspecting a light emission characteristic of a display screen, comprising:
   a carrying device provided for carrying the display screen whose emitting light is emitted from an emitting surface that is a top surface of the display screen;
   a cover device having a detecting surface, the detecting surface being provided with a plurality of luminance detectors for detecting the light emission characteristic of the emitting light that is emitted from the top surface of the display screen, the cover device being provided for covering emitting surface of the display screen to form a darkroom between the top surface of the display screen and a surface of the luminance detectors, and a plurality of luminance information of the emitting surface being generated by the luminance detectors that are for detecting a plurality of measuring zones of the emitting surface; and
   a data analyzing device receiving the plurality of luminance information of the plurality of measuring zones and analyzing the light emission characteristic of the emitting light emitted from the emitting surface of the display screen according to the plurality of luminance information of the plurality of measuring zones.

2. The inspecting equipment as claimed in claim 1, wherein the luminance detectors are arranged in a form of an array.

3. The inspecting equipment as claimed in claim 1, wherein the luminance information is an electric signal.

4. The inspecting equipment as claimed in claim 1, wherein the carrying device further includes an elevating means for adjusting a height of the cover device.

5. The inspecting equipment as claimed in claim 1, wherein the carrying device further includes a transportation means for transporting the display screen to an inspecting location where the cover device is provided.

6. The inspecting equipment as claimed in claim 1, further including a screen adjustment device for adjusting a screen of the display screen.

7. The inspecting equipment as claimed in claim 1, wherein, the luminance detectors include an all-optical wavelength detector for detecting a luminance of all-optical wavelength of the emitting light.

8. The inspecting equipment as claimed in claim 1, wherein the luminance detectors include a red detector, a green detector, and a blue detector for detecting a red luminance, a green luminance and a blue luminance.

9. The inspecting equipment as claimed in claim 1, further including a reading signal device which is connected with the luminance detectors, wherein the reading signal device reads the luminance information in an alternatively switching and reading manner, and transmits the luminance information to the data analyzing device.

10. The inspecting equipment as claimed in claim 1, further including a configuration adjustment device for adjusting a display configuration of the display screen according to the light emission characteristic.

\* \* \* \* \*